United States Patent
Li et al.

(10) Patent No.: US 11,170,374 B2
(45) Date of Patent: Nov. 9, 2021

(54) METHOD, APPARATUS AND ELECTRONIC DEVICE FOR BLOCKCHAIN TRANSACTIONS

(71) Applicant: ADVANCED NEW TECHNOLOGIES CO., LTD., Grand Cayman (KY)

(72) Inventors: Lichun Li, Hangzhou (CN); Wenbin Zhang, Hangzhou (CN); Baoli Ma, Hangzhou (CN); Zheng Liu, Hangzhou (CN); Shan Yin, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/817,741

(22) Filed: Mar. 13, 2020

(65) Prior Publication Data

US 2020/0211018 A1 Jul. 2, 2020

Related U.S. Application Data

(63) Continuation of application No. 16/592,047, filed on Oct. 3, 2019.

(30) Foreign Application Priority Data

Oct. 25, 2018 (CN) ............................ 201811249440

(51) Int. Cl.
*G06Q 20/40* (2012.01)
*H04L 9/06* (2006.01)

(52) U.S. Cl.
CPC ....... *G06Q 20/4014* (2013.01); *H04L 9/0637* (2013.01); *H04L 2209/38* (2013.01); *H04L 2209/56* (2013.01)

(58) Field of Classification Search
CPC ............ G06Q 20/4014; H04L 9/0637; H04L 2209/38
See application file for complete search history.

(56) References Cited

U.S. PATENT DOCUMENTS 10,102,526 B1   10/2018  Madisetti et al.
10,373,129 B1 *   8/2019  James ................... H04L 9/3247
(Continued)

FOREIGN PATENT DOCUMENTS

| CN | 106549749 A | 3/2017 |
|---|---|---|
| CN | 106682984 A | 5/2017 |

(Continued)

OTHER PUBLICATIONS

International Search Report and Written Opinion for Application No. PCT/US2019/054462, dated Dec. 10, 2019, 13 pages.

(Continued)

*Primary Examiner* — Steven S Kim
*Assistant Examiner* — Terry Nathan Murray

(57) ABSTRACT

A method for implementing blockchain-based transactions comprises: determining a transaction amount to be remitted from a remitter's blockchain account into a receiver's blockchain account, wherein a balance of the remitter's blockchain account comprises multiple reserve balances, and commitments of the reserve balances are recorded in a blockchain; selecting one or more of the reserve balances from the remitter's blockchain account, wherein the sum of the selected one or more reserve balances is not smaller than the transaction amount; and submitting to the blockchain a transaction comprising an identification of each of the selected one or more reserve balances and a commitment of the transaction amount, for the selected one or more reserve balances to be removed from the remitter's blockchain (Continued)

account and the transaction amount to be added to the receiver's blockchain account.

15 Claims, 7 Drawing Sheets

(56) References Cited

U.S. PATENT DOCUMENTS

| | | | |
|---|---|---|---|
| 10,402,793 | B2 | 9/2019 | Haldenby et al. |
| 2003/0104857 | A1* | 6/2003 | Jenkins .................. G06Q 50/34 463/17 |
| 2016/0234026 | A1* | 8/2016 | Wilkins ................ H04L 9/3247 |
| 2016/0342989 | A1 | 11/2016 | Davis |
| 2016/0358165 | A1* | 12/2016 | Maxwell ............ G06Q 20/0655 |
| 2017/0048235 | A1* | 2/2017 | Lohe ....................... G06Q 20/10 |
| 2017/0300876 | A1* | 10/2017 | Musiala, Jr. ........... G06Q 40/02 |
| 2017/0323294 | A1 | 11/2017 | Rohlfing et al. |
| 2017/0372308 | A1 | 12/2017 | Metnick et al. |
| 2018/0025331 | A1* | 1/2018 | Dallenbach ............ G06Q 20/36 705/39 |
| 2018/0041345 | A1* | 2/2018 | Maim .................. G06Q 20/065 |
| 2018/0075453 | A1 | 3/2018 | Durvasula et al. |
| 2018/0189867 | A1* | 7/2018 | Hu .......................... G06F 16/951 |
| 2018/0191503 | A1* | 7/2018 | Alwar ................... H04L 9/0637 |
| 2019/0108543 | A1* | 4/2019 | Chan .................. G06Q 30/0229 |
| 2019/0180311 | A1* | 6/2019 | Chan .................. G06Q 30/0236 |
| 2019/0259033 | A1* | 8/2019 | Reddy ..................... G06N 3/08 |
| 2019/0303887 | A1 | 10/2019 | Wright et al. |
| 2019/0311392 | A1* | 10/2019 | Swamidurai ....... G06Q 30/0227 |
| 2019/0378133 | A1* | 12/2019 | Deshpande ......... G06F 16/1805 |
| 2020/0042960 | A1* | 2/2020 | Cook .................... H04L 9/3239 |
| 2020/0042971 | A1* | 2/2020 | Eby ........................ G06Q 20/29 |
| 2020/0051071 | A1* | 2/2020 | Wu ....................... G06Q 20/401 |
| 2020/0058023 | A1* | 2/2020 | Travizano ........... G06F 16/9566 |
| 2020/0192873 | A1 | 6/2020 | Chang |
| 2020/0211011 | A1* | 7/2020 | Anderson .............. G06Q 20/36 705/39 |

FOREIGN PATENT DOCUMENTS

| | | |
|---|---|---|
| CN | 107077675 A | 8/2017 |
| CN | 107358525 A | 11/2017 |
| CN | 107392584 A | 11/2017 |
| CN | 107392603 A | 11/2017 |
| CN | 107545419 A | 1/2018 |
| CN | 107851246 A | 3/2018 |
| CN | 108885748 A | 11/2018 |
| CN | 108985100 A | 12/2018 |
| CN | 110050474 A | 7/2019 |
| JP | 6445211 B1 | 12/2018 |
| JP | 2019185370 A | 10/2019 |
| KR | 20190136610 A | 12/2019 |
| TW | 201837821 A | 10/2018 |
| WO | 2018/115567 A1 | 6/2018 |
| WO | 2018/127923 A1 | 7/2018 |

OTHER PUBLICATIONS

First Search Report for Chinese Application No. 201811249440.5, dated May 31, 2019, 1 page.
Supplementary Search for Chinese Application No. 201811249440. 5, dated Dec. 16, 2019, 1 page.
First Office Action for Chinese Application No. 201811249440.5, dated Jun. 11, 2019, 18 pages.
Second Office Action for Chinese Application No. 201811249440.5, dated Oct. 9, 2019, 20 pages.
Third Office Action for Chinese Application No. 201811249440.5, dated Dec. 25, 2019, 16 pages.
Rectinajh., "Ethereum: the next generation of smart contracts and decentralized application platforms", Jan. 2018, received from https://www.jianshu.com/p/a4e32c50262a.
Huang et al., "Honest-Sender Commitment and Honest-Receiver Commitment", Journal of Electronics & Information Technology, 2011, vol. 33, No. 4, p. 849-853.
Jianshu. "Mastering Bitcoin", Dec. 2017, received from https://www.jianshu.com/p/ed92cd055c40.
Written Opinion for International Application No. PCT/US2019/054462, dated Sep. 11, 2020, 9 pages.
Zyskind et al., "Enigma: Decentralized Computation Platform with Guaranteed Privacy", arvix.org, Cornell University Library, Jun. 14, 2015, pp.
Search Report for Taiwanese Application No. 108110890 dated Apr. 28, 2020.
International Preliminary Report on Patentability for Application No. PCT/US2019/054462, dated Feb. 10, 2021, 18 pages.
Non-Final Office Action for U.S. Appl. No. 16/592,047, dated Feb. 24, 2021, 40 pages.

* cited by examiner

```
┌─────────────────────────────────────────────────────────┐
│ Determining a transaction amount to be remitted from a  │
│ remitter's blockchain account into a receiver's         │
│ blockchain account, wherein a balance of the remitter's │─── 102
│ blockchain account comprises a plurality of reserve     │
│ balances, and a commitment of each of the plurality of  │
│ reserve balances is recorded in a blockchain            │
└─────────────────────────────────────────────────────────┘
                             │
                             ▼
┌─────────────────────────────────────────────────────────┐
│ Selecting one or more of the plurality of reserve       │
│ balances from the remitter's blockchain account,        │
│ wherein the sum of the selected one or more of the      │─── 104
│ plurality of reserve balances is not smaller than the   │
│ transaction amount                                      │
└─────────────────────────────────────────────────────────┘
                             │
                             ▼
┌─────────────────────────────────────────────────────────┐
│ Submitting to the blockchain a transaction comprising   │
│ an identification of each of the selected one or more   │
│ of the plurality of reserve balances and a commitment   │
│ of the transaction amount, for the selected one or      │─── 106
│ more of the plurality of reserve balances to be removed │
│ from the remitter's blockchain account and the          │
│ transaction amount to be added to the receiver's        │
│ blockchain account after the transaction is implemented │
└─────────────────────────────────────────────────────────┘
```

FIG. 1

METHOD, APPARATUS AND ELECTRONIC DEVICE FOR BLOCKCHAIN TRANSACTIONS

CROSS REFERENCE TO RELATED APPLICATION

The present application is a continuation of U.S. application Ser. No. 16/592,047, filed Oct. 3, 2019, and titled "Method, Apparatus and Electronic Device for Blockchain Transactions," which is based on and claims priority to Chinese Patent Application No. 201811249440.5, filed on Oct. 25, 2018. All of the above applications are incorporated herein by reference in their entirety.

TECHNICAL FIELD

One or more embodiments of the specification relate to the technical field of blockchain, particularly to a method, apparatus, and electronic device for implementing blockchain-based transactions.

BACKGROUND

Blockchain nodes of a blockchain network may jointly maintain a unified blockchain ledger through a consensus reached among the blockchain nodes, to record data of transactions having occurred on the blockchain network. The blockchain ledger can be made public for viewing and verification of historical data of the occurred transactions at any time.

SUMMARY

One or more embodiments of the specification provide a method, apparatus, and electronic device for implementing blockchain-based transactions. According to a first aspect of the specification, a method for implementing blockchain-based transactions is provided. The method may comprise: determining a transaction amount to be remitted from a remitter's blockchain account into a receiver's blockchain account, wherein a balance of the remitter's blockchain account comprises a plurality of reserve balances, and a commitment of each of the plurality of reserve balances is recorded in a blockchain; selecting one or more of the plurality of reserve balances from the remitter's blockchain account, wherein the sum of the selected one or more of the plurality of reserve balances is not smaller than the transaction amount; and submitting to the blockchain a transaction comprising an identification of each of the selected one or more of the plurality of reserve balances and a commitment of the transaction amount, for the selected one or more of the plurality of reserve balances to be removed from the remitter's blockchain account and the transaction amount to be added to the receiver's blockchain account after the transaction is implemented.

In some embodiments, the balance of the remitter's blockchain account further comprises a first inward remittance balance; the method further comprises: in response to that the balance of the remitter's blockchain account increases, adding a corresponding amount to the first inward remittance balance.

In some embodiments, in response to that the sum of the selected one or more of the plurality of reserve balances is greater than the transaction amount, a change amount is added to the first inward remittance balance after the transaction is implemented, and wherein the change amount is the difference between the sum of the selected one or more of the plurality of reserve balances and the transaction amount.

In some embodiments, the balance of the remitter's blockchain account further comprises an outward remittance balance, and the outward remittance balance comprises the plurality of the reserve balances.

In some embodiments, the method further comprises: converting at least one part of the first inward remittance balance to the outward remittance balance.

In some embodiments, a balance of the receiver's blockchain account comprises a second inward remittance balance, and a commitment of the second inward remittance balance is recorded in the blockchain; and wherein the commitment of the transaction amount is added to the commitment of the second inward remittance balance after the transaction is implemented.

In some embodiments, the commitment of the transaction amount is an encryption of the transaction amount based on a transaction random number, and the commitment of the second inward remittance balance is an encryption of the second inward remittance balance based on an inward remittance balance random number.

In some embodiments, the method is implementable by a first computing device associated with the remitter, and the method further comprises: sending the transaction random number to a second computing device associated with the receiver via an off-chain channel for the second computing device associated with the receiver to determine an updated second inward remittance balance according to an updated commitment of the second inward remittance balance and an updated inward remittance balance random number; wherein the updated commitment of the second inward remittance balance is obtained by adding the commitment of the transaction amount to the commitment of the second inward remittance balance, the updated inward remittance balance random number is obtained by adding the transaction random number to the inward remittance balance random number, and the updated second inward remittance balance is the sum of the second inward remittance balance and the transaction amount.

In some embodiments, before submitting to the blockchain the transaction, the method further comprises: sending the commitment of the transaction amount to the second computing device associated with the receiver via an off-chain channel for the second computing device associated with the receiver to verify an association among the commitment of the transaction amount, the transaction random number, and the transaction amount.

In some embodiments, the method further comprises: obtaining a receiver signature endorsing the commitment of the transaction amount, wherein the receiver signature is generated by the second computing device associated with the receiver based on a receiver private key, in response to successful verification of the association; and adding the receiver signature to the transaction for a plurality of blockchain nodes in the blockchain to verify the receiver signature.

In some embodiments, the method further comprises: generating a remitter signature endorsing the commitment of the transaction amount based on a remitter private key; and adding the remitter signature to the transaction for a plurality of blockchain nodes in the blockchain to verify the remitter signature.

In some embodiments, the method further comprises: generating a range proof; and adding the range proof to the transaction for a plurality of blockchain nodes in the blockchain to verify that the sum of the selected one or more of the plurality of reserve balances is not smaller than the transaction amount.

According to a second aspect of the specification, an apparatus for implementing blockchain-based transactions is provided. The apparatus may comprise: one or more processors and one or more non-transitory computer-readable memories coupled to the one or more processors and configured with instructions executable by the one or more processors to cause the system to perform operations comprising: determining a transaction amount to be remitted from a remitter's blockchain account into a receiver's blockchain account, wherein a balance of the remitter's blockchain account comprises a plurality of reserve balances, and a commitment of each of the plurality of reserve balances is recorded in a blockchain; selecting one or more of the plurality of reserve balances from the remitter's blockchain account, wherein the sum of the selected one or more of the plurality of reserve balances is not smaller than the transaction amount; and submitting to the blockchain a transaction comprising an identification of each of the selected one or more of the plurality of reserve balances and a commitment of the transaction amount, for the selected one or more of the plurality of reserve balances to be removed from the remitter's blockchain account and the transaction amount to be added to the receiver's blockchain account after the transaction is implemented.

According to a third aspect of the specification, a non-transitory computer-readable storage medium is provided. The non-transitory computer-readable storage medium is configured with instructions executable by one or more processors to cause the one or more processors to perform operations comprising: determining a transaction amount to be remitted from a remitter's blockchain account into a receiver's blockchain account, wherein a balance of the remitter's blockchain account comprises a plurality of reserve balances, and a commitment of each of the plurality of reserve balances is recorded in a blockchain; selecting one or more of the plurality of reserve balances from the remitter's blockchain account, wherein the sum of the selected one or more of the plurality of reserve balances is not smaller than the transaction amount; and submitting to the blockchain a transaction comprising an identification of each of the selected one or more of the plurality of reserve balances and a commitment of the transaction amount, for the selected one or more of the plurality of reserve balances to be removed from the remitter's blockchain account and the transaction amount to be added to the receiver's blockchain account after the transaction is implemented.

BRIEF DESCRIPTION OF THE DRAWINGS

FIG. 1 is a flowchart of a method for implementing blockchain-based transactions according to some embodiments.

DETAILED DESCRIPTION

Figure 2:
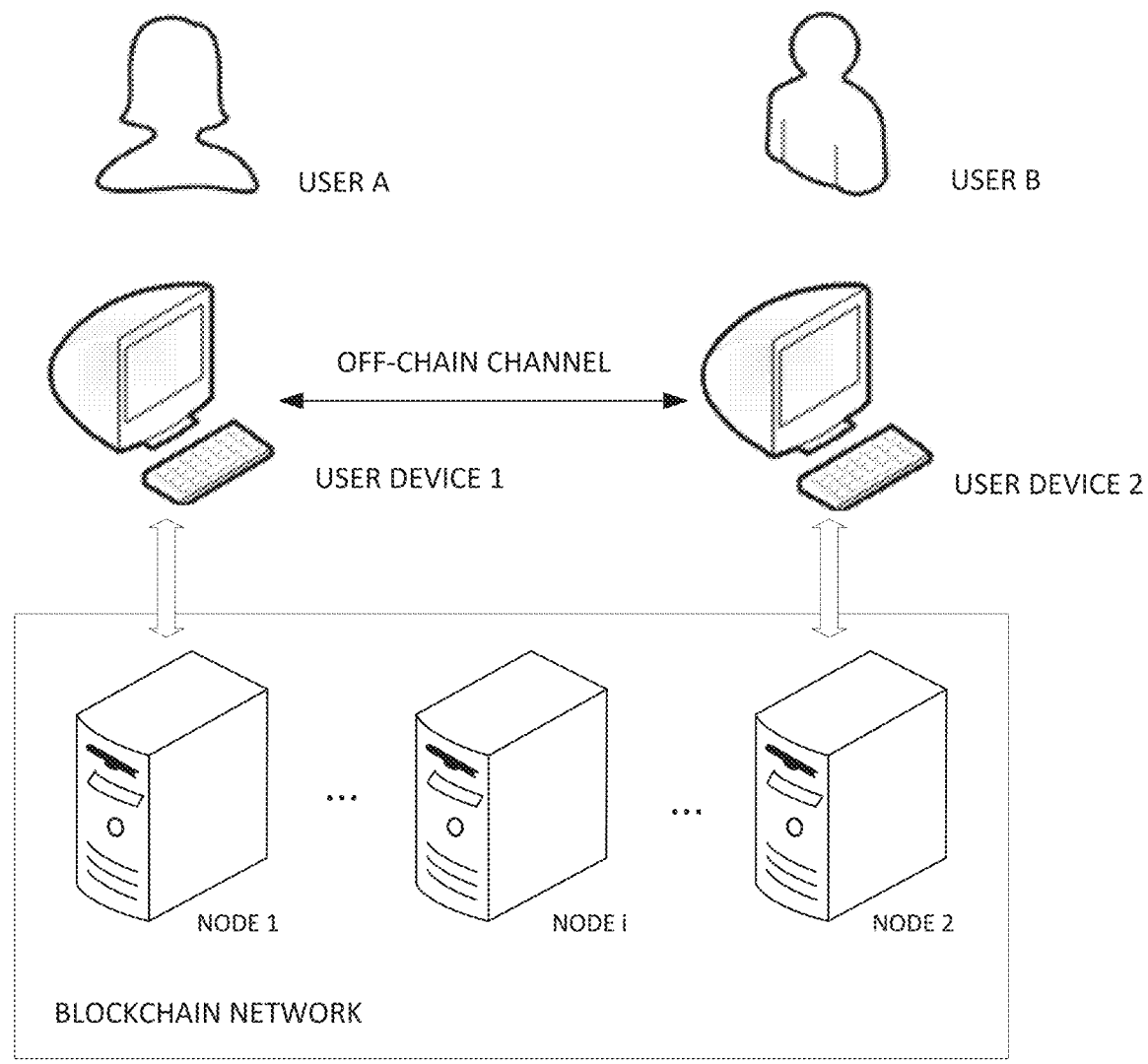
FIG. 2 is a schematic diagram of implementation of a remittance transaction in a blockchain network according to some embodiments.

Embodiments will be described in detail, with examples shown in the accompanying drawings. When the description below involves the accompanying drawings, unless otherwise indicated, the same numeral in different accompanying drawings stands for the same or similar element. The implementation manners described in the following embodiments do not represent all the implementation manners consistent with the specification. Conversely, they are only examples of the apparatus and methods described in detail in the attached claims and consistent with some aspects of one or more embodiments of the specification.

In some embodiments, it is not necessary to perform steps in the methods according to the sequence illustrated and described in the specification. In some other embodiments, the steps of the methods may be more or less than those described in the specification. Further, a single step described in the specification may be split into multiple steps for description in other embodiments, while multiple steps described in the specification may be merged into one single step for description in yet other embodiments.

FIG. 1 is a flowchart of a method for implementing blockchain-based transactions according to some embodiments. As shown in FIG. 1, this method may be implemented by a computing device as a remitter device, and may comprise the following steps: 102-106.

In the specification, a remitter and receiver may refer to an individual or entity participating blockchain-based transactions. For example, a remitter may be an individual or entity remitting money to a receiver through a transaction. A receiver may be an individual or entity receiving money from a remitter through the transaction. A remitter device refers to a computing device associated with a remitter who remits money to a receiver through one or more transactions. A receiver device refers to a computing device associated with a receiver who receives money from a remitter through one or more transactions. The computing device may be a personal computer, a laptop computer, a cell phone, a camera phone, a smart phone, a PDA (personal digital assistant), a media player, a navigation device, an email sending and receiving device, a game console, a tablet computer, a wearable device or any combination of a few of these devices. For convenience and conciseness, a remitter and receiver described in the specification may also refer to a computing device associated with the human or entity remitter and receiver respectively.

Step 102, determining a transaction amount to be remitted from a remitter's blockchain account into a receiver's blockchain account, wherein a balance of the remitter's blockchain account comprises a plurality of reserve balances, and a commitment of each of the plurality of reserve balances is recorded in a blockchain.

In some embodiments, a remitter may negotiate with a receiver to determine a transaction amount. A blockchain transaction between the remitter and receiver can be implemented between the remitter device and the receiver device by remitting (or transferring) an asset certificate corresponding to the transaction amount to be remitted from a blockchain account of the remitter to a blockchain account of the receiver. The asset certificate may correspond to a token, a digital asset or any other intelligent asset in a blockchain. Alternatively, the asset certificate may correspond to cash, security, a discount coupon, a real estate and any other asset not in the blockchain.

In some embodiments, the blockchain nodes in a blockchain may respectively maintain unified blockchain ledgers based on a consensus. Therefore, by recording commitments of the remitter's reserve balances in the blockchain, the blockchain ledgers maintained by the blockchain nodes may not need to record the remitter's reserve balances. As a result, the remitter's reserve balances held by a remitter are concealed as private data. Similarly, the balance of the remitter's blockchain account (also referred to as "the remitter's balance" hereinafter) may be recorded as a commitment of the remitter's balance in the blockchain ledger. A balance of the receiver's blockchain account (also referred to as "the receiver's balance") and the receiver's reserve balances, etc., held by the receiver may also be recorded as a commitment of the receiver's balance and commitments of the receiver's reserve balances in the blockchain ledger. In fact, the balances of any type held by the remitters and the receivers are recorded as corresponding commitments of the balances in the blockchain ledger to protect the privacy of the owners (remitters and receivers) Similarly, the transaction amounts may be recorded as the commitment of the transaction amounts in the blockchain ledger to protect the privacy of the transactions. Associations between a balance and a corresponding commitment of the balance and between a transaction amount and a corresponding commitment of the transaction amount will not be elaborated again hereinafter.

In some embodiments, a commitment of a balance may be generated by a homomorphic encryption algorithm. For example, a commitment of one of the remitter's reserve balances may be generated based on a homomorphic encryption algorithm. Any type of homomorphic encryption algorithm may be used in the specification, for example, a Pedersen commitment mechanism.

In some embodiments, the entire remitter's balance are divided into a plurality of remitter's reserve balances. In other words, the remitter's balance is the sum of the plurality of remitter's reserve balances. Alternatively, one part of the remitter's balance may be divided into the plurality of remitter's reserve balances.

In some embodiments, each of the remitter's reserve balances may be equal in value. In other embodiments, the values of the remitter's reserve balances may be irrelevant (equal or not equal).

Step 104, selecting one or more of the plurality of reserve balances from the remitter's blockchain account, wherein the sum of the selected one or more of the plurality of reserve balances is not smaller than the transaction amount.

Step 106, submitting to the blockchain a transaction comprising an identification of each of the selected one or more of the plurality of reserve balances and a commitment of the transaction amount, for the selected one or more of the plurality of reserve balances to be removed from the remitter's blockchain account and the transaction amount to be added to the receiver's blockchain account after the transaction is implemented.

In some embodiments, the remitter's balance are divided into the plurality of remitter's reserve balances, enabling the blockchain network to use the plurality of remitter's reserve balances in different outward remittance transactions in an account model. Therefore, the outward remittance transactions and the remitter's balance of the remitter's blockchain account can be unbound, and associations among different outward remittances can be eliminated, realizing parallel transaction in an account model and improving the transaction throughput of the blockchain network.

In some embodiments, the remitter's balance may also be divided into a first inward remittance balance. When the remitter's balance of the remitter's blockchain account increases, a corresponding amount is added to the first inward remittance balance. By dividing the remitter's balance into multiple remitter's reserve balances and a first inward remittance balance, the remitter's reserve balances may be applied to outward remittance transactions, and the first inward remittance balance may be applied to an inward remittance transaction, thereby achieving decoupling between the outward remittance transactions and the inward remittance transaction, ensuring that the remitter's blockchain account can participate in the outward remittance transactions and the inward remittance transaction simultaneously, and improving the transaction throughput.

In some embodiments, the remitter's balance may also be divided into an outward remittance balance. At least a portion of the outward remittance balance is further divided into the plurality of remitter's reserve balances. Further, at least a portion of the first inward remittance balance may be converted to the outward remittance balance, thereby achieving asset conversion within the remitter's blockchain account. The asset conversion operation is not related to the status of the balance of the remitter's blockchain account, thus ensuring that the inward remittance transaction and the outward remittance transaction that the remitter's blockchain account participates in can be executed in any sequence and avoiding concurrent restrictions. In addition, the outward remittance balance obtains an asset from the first inward remittance balance and the outward remittance balance is divided into the multiple remitter's reserve balances, eliminating the association between the generation of new remitter's reserve balances and the remittance transactions that the generated remitter's reserve balances participate in. Therefore, the generation of the remitter's reserve balances cannot cause interruption of the outward remittance transactions, ensuring the non-interrupted execution of the remittance transactions.

In some embodiments, when the sum of the selected remitter's reserve balances is greater than the transaction amount, a change amount is added to the first inward remittance balance after the transaction is implemented. The change amount is the difference between sum of the selected remitter's reserve balances and the transaction amount. The first inward remittance balance is involved in the inward remittance transaction and is not related to the outward remittance transactions that the remitter's blockchain account participates in. Therefore, parallel execution of the outward remittance transactions cannot be affected when the change amount is added to the first outward remittance balance.

In some embodiments, the receiver's balance of the receiver's blockchain account may also be divided into a second inward remittance balance. The second inward remittance balance may be recorded as a corresponding commitment of the second inward remittance balance in the blockchain. The commitment of the transaction amount is added to the commitment of the second inward remittance balance after the transaction is implemented. When the homomorphic encryption algorithm is used and the homomorphic encryption algorithm meets additive homomorphism, the commitment of the second inward remittance balance and the commitment of the transaction amount may be added together, and the above-described transaction amount may be added to the updated second inward remittance balance corresponding to the updated second inward remittance balance commitment.

In some embodiments, the commitment of the transaction amount is calculated by applying a predetermined encryption algorithm to the transaction amount based on a transaction random number. The commitment of the second inward remittance balance is calculated by applying the predetermined encryption algorithm to the second inward remittance balance based on an inward remittance balance random number. The remitter device may send the transaction random number to the receiver device via an off-chain channel so that the receiver device determines an updated second inward remittance balance according to an updated commitment of the second inward remittance balance and an updated inward remittance balance random number. The updated commitment of the second inward remittance balance is obtained by adding the commitment of the transaction amount to the commitment of the second inward remittance balance. The updated inward remittance balance random number is obtained by adding the transaction random number to the inward remittance balance random number. The updated second inward remittance balance is the sum of the second inward remittance balance and the transaction amount.

In some embodiments, the remitter device may send the commitment of the transaction amount to the receiver device via an off-chain channel before submission of the transaction so that the receiver device verifies the associations among the commitment of the transaction amount, the transaction random number and the transaction amount. The receiver device may allow implementation of the transaction after the verification succeeds; otherwise may reject the implementation of the transaction. For example, receiver device may provide the following receiver signature after the verification succeeds; otherwise may not provide the receiver signature.

In some embodiments, the receiver device may generate the receiver signature based on a receiver private key and the receiver signature endorses the commitment of the transaction amount. In some embodiments, the receiver device may generate the receiver signature after the association has been verified. The remitter device may obtain the receiver signature, and add the receiver signature to the transaction so that the blockchain nodes in the blockchain verify the receiver signature. For example, when a transaction does not contain a receiver signature, the blockchain nodes may determine that consensus fails and then refuse to proceed with the transaction.

In some embodiments, the remitter device may generate a remitter signature endorsing the commitment of the transaction amount based on a remitter private key, and add the remitter signature to the transaction so that the blockchain nodes in the blockchain verify the remitter signature. Further, the remitter signature may also endorse a range proof. For example, when a transaction does not contain a remitter signature, the blockchain nodes may determine that consensus fails, and thus reject to proceed with the transaction.

In some embodiments, the remitter device may generate a range proof, and add the range proof to the transaction so that the blockchain nodes in the blockchain verify whether the transaction amount is not smaller than zero and the sum of the selected remitter's reserve balances is not smaller than the transaction amount. By using the remitter's reserve balances separated from the remitter's balance, the range proof is related to the remitter's reserve balances, but not related to the remitter's balance. Therefore, the remitter's blockchain account can participate in multiple outward remittance transactions in parallel and can ensure that the range proof contained in each outward remittance transaction can pass the verification by the blockchain nodes.

A remittance transaction in a blockchain network is taken as an example below to describe the technical solution of the specification in detail. FIG. 2 is a schematic diagram of implementation of a remittance transaction in a blockchain network according to various embodiments. As shown in FIG. 2, it is assumed that a user A conducts remittance to a user B in a blockchain. A "user" in the specification may be manifested as a login user account, while this user account may belong to an individual or an organization.

It is assumed that a remitter device used by the user A is a user device 1. For instance, a user account corresponding to the user A is logged in on this user device 1. Similarly, a receiver device used by the user B is a user device 2. An off-chain channel may be established between the user device 1 and user device 2 to achieve corresponding off-chain communication.

A client program of blockchain may be run on the user device 1 so that the user device 1 runs a corresponding blockchain node in the blockchain network, such as the node 1 shown in FIG. 2. Similarly, a client program of blockchain may be run on the user device 2 so that the user device 2 also runs a corresponding blockchain node in the blockchain network, such as the node 2 shown in FIG. 2. The blockchain network also includes other blockchain nodes, such as the node k shown in FIG. 2. The blockchain nodes are not enumerated here. Through the foregoing node 1, node 2, etc., the remittance transaction between the user A and the user B may be implemented via the blockchain network, and related transaction information may be recorded in the blockchain ledger maintained by the blockchain nodes respectively, thereby preventing the recorded transaction information from being tampered with, and also facilitating subsequent inspection.

In the embodiments of the specification, the blockchain account structure using an account model is improved and the improved blockchain account structure may be applied to high-concurrency fund inward and outward remittance scenarios. The improved blockchain account structure is detailed hereinafter with reference to FIG. 3.

Figure 3:
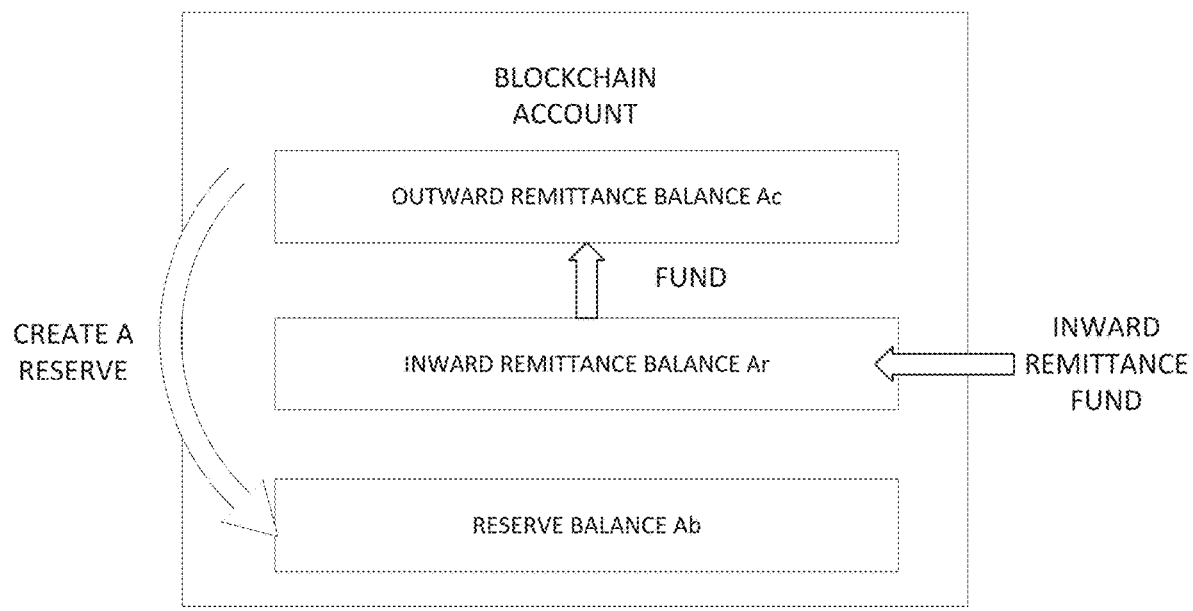
FIG. 3 is a schematic diagram of an improved blockchain account structure according to some embodiments.

FIG. 3 is a schematic diagram of an improved blockchain account structure according to some embodiments. As shown in FIG. 3, in the account model, the account balance in the blockchain account is divided into three parts: an outward remittance balance Ac, an inward remittance balance Ar, and a reserve balance Ab.

The blockchain account may participate in the inward remittance transaction in the blockchain network by using the inward remittance balance Ar. For example, the inward remittance transaction is the transaction where a fund is transferred into the blockchain account. In some embodiments, all the funds to be transferred into the blockchain account may be remitted into the inward remittance balance Ar, while being irrelevant to the outward remittance balance Ac and the reserve balance Ab. For example, when the user A transfers funds to the user B, the funds are transferred from the user A's blockchain account 1 to the user B's blockchain account 2, and are transferred to the inward remittance balance Ar_B in the user B's blockchain account 2.

The blockchain account may participate in the outward remittance transaction in the blockchain network by using the reserve balance Ab. For example, the outward remittance transaction is the transaction where a fund is remitted outwards from the blockchain account. The outward remittance balance Ac may be obtained from the inward remittance balance Ar. In other words, funds in the inward remittance balance Ar may be converted into the outward remittance balance Ac. Division of at least one portion of the outward remittance balance Ac may create one or more reserve balances Ab. The reserve balances Ab may be then applied to the outward remittance transaction in the blockchain network.

Figure 4:
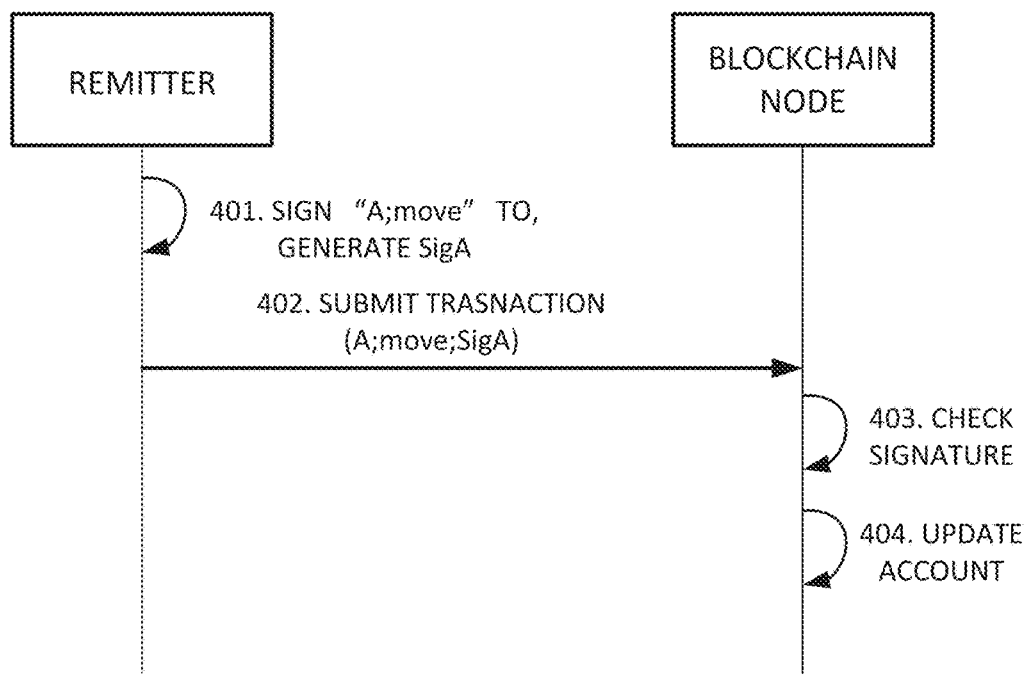
FIG. 4 is a diagram of an interaction process for implementing a fund conversion within an account according to some embodiments.

The following is an example by taking the user A as the remitter to describe the process of fund conversion from the inward remittance balance Ar_A to the outward remittance balance Ac_A within the user A's blockchain account 1. FIG. 4 is a diagram of an interaction process for implementing a fund conversion within an account according to some embodiments. As shown in FIG. 4, the interaction process may comprise the following steps: 401-404.

Step 401, sign "A; move" to generate SigA.

In some embodiments, an operation irrelevant to the account balance is added in the blockchain account, namely the "move" operation, through which all the funds in the inward remittance balance Ar are converted or allocated into the outward remittance balance Ac. In the above-described "A; move," "A" stands for the user A's blockchain account 1, "move" stands for the move operation, and "A; move" stands for that: all the funds in the inward remittance balance Ar_A of the user A's blockchain account 1 are converted or allocated into the outward remittance balance Ac_A.

Step 402, the remitter submits a transaction (A; move; SigA) to the blockchain.

In some embodiments, the remitter may submit a transaction (A; move; SigA) to the blockchain via a node 1 to execute the transaction. The transaction may be transmitted to all the blockchain nodes in the blockchain network and all the blockchain nodes may verify the transaction respectively so as to update the account of remitter and implement fund conversion when the verification is successful, and to reject to update the account when the verification is not successful.

Step 403, the blockchain nodes check the signature.

In some embodiments, the blockchain nodes may check if the signature SigA contained in the transaction (A; move; SigA) is correct. If the signature is not correct, the execution of this transaction may be rejected, otherwise the process proceeds to Step 404.

Step 404, the blockchain nodes update the account.

In some embodiments, in the maintained blockchain ledgers, the blockchain nodes update the blockchain account 1 of the user A. For example, the blockchain ledger originally records: an outward remittance balance Ac_A=PC1 and an inward remittance balance Ar_A=PC2 in the user A's blockchain account 1, where PC1 is a commitment of the fund contained in the outward remittance balance Ac_A, which may be obtained based on a Pedersen commitment mechanism, and PC2 is a commitment of the fund contained in the inward remittance balance Ar_A, which may be obtained based on a Pedersen commitment mechanism. Through the interaction shown in FIG. 4, all the funds in the inward remittance balance Ar_A may be converted or allocated into the outward remittance balance Ac_A, which causes the content on the blockchain ledger to be updated to: an outward remittance balance Ac_A=PC1+PC2 and inward remittance balance Ar_A=0.

Though in FIG. 4, all the funds in the inward remittance balance Ar_A are converted or allocated into the outward remittance balance Ac_A through the move operation. Due to demands in some scenarios, the user A may choose to convert a designated amount of fund instead of converting all the funds. For example, the user A may designate a fund amount q to be converted, calculate a commitment Q corresponding to the amount q through a Pedersen commitment mechanism, generate a range proof PR1 for proving that q is no smaller than zero and a range proof PR2 for proving that the fund amount contained in the inward remittance balance Ar_A is no smaller than q, and sign (A;Q;PR1,PR2) to obtain a remitter signature SigA, then the remitter submits a transaction (A;Q;PR1,PR2;SigA) to the blockchain.

Therefore, if it is assumed that the blockchain ledger originally records: an outward remittance balance Ac_A=PC1 and an inward remittance balance Ar_A=PC2 in User A's blockchain account 1, then based on the above-described transaction, the fund q may be converted or allocated from the inward remittance balance Ar_A to the outward remittance balance Ac_A, and the content on the blockchain ledger may be updated to: an outward remittance balance Ac_A=PC1+Q and an inward remittance in balance Ar_A=PC2−Q.

Figure 5:
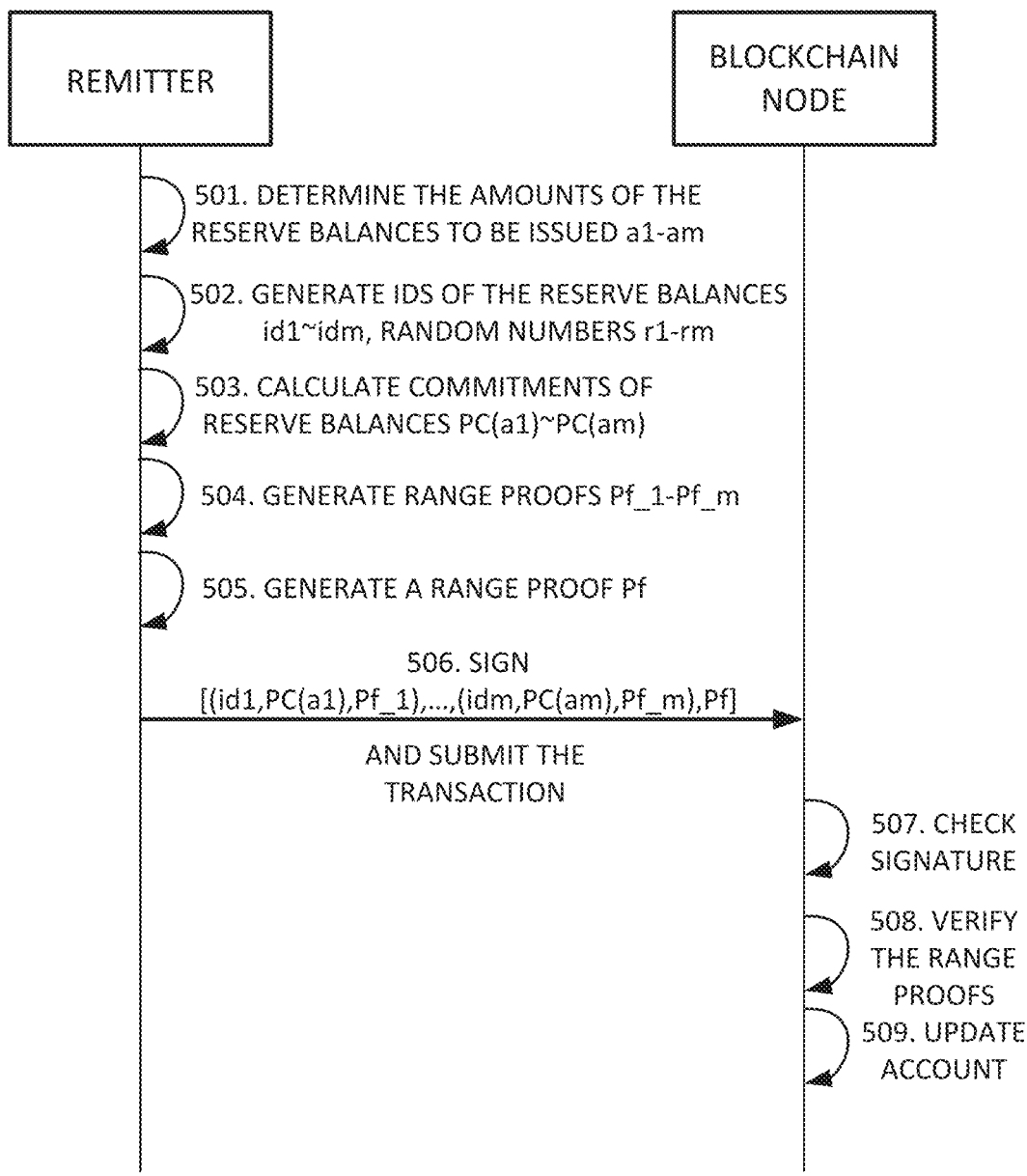
FIG. 5 is a diagram of an interaction process for creating multiple reserve balances according to some embodiments.

The following is an example by taking the user A as the remitter to describe the creation process of the reserve balance in the user A's blockchain account 1. FIG. 5 is a diagram of an interaction process for creating multiple reserve balances according to some embodiments. As shown in FIG. 5, the interaction process may comprise the following steps: 501-509.

Step 501, determining the amounts of the reserve balances to be issued a1−am.

In some embodiments, assuming that the remitter is to create m reserve balances, the remitter may designate the amount of each reserve balance as a1, a2 . . . am respectively. For example, the user A may use all the outward remittance balance Ac_A in the user A's blockchain account 1 to create the m reserve balances. For example, assuming that the fund contained in the outward remittance balance Ac_A is p1, then the above-described amounts a1−am each are p1/m. In another example, the remitter may designate a fund p2 for creating the reserve balances and the fund p2 is no greater than fund p1 contained in the outward remittance balance Ac_A. Then, the above-described amounts a1−am each are p2/m. In still another example, the remitter may set an amount for each reserve balance respectively, i.e., setting the amounts a1−am, provided that the sum of all reserve balance amounts is no greater than fund p1 contained in the outward remittance balance Ac_A.

Step 502, the remitter generates an ID and a random number corresponding to each reserve balance.

In some embodiments, the ID corresponding to the reserve balance with the amount of a1 is id1 and the corresponding random number is r1, the ID corresponding to the reserve balance with the amount of a2 is id2 and the corresponding random number is r2, . . . and the ID corresponding to the reserve balance with the amount of am is idm and the corresponding random number is rm.

Step 503, the remitter calculates a commitment of each reserve balance.

In some embodiments, the remitter may calculate a commitment of each reserve balance via a Pedersen commitment mechanism. For example, the commitment of the reserve balance id1 is represented by PC(a1), so according to the amount a1 corresponding to the reserve balance id1 and the corresponding random number r1, it may be determined PC(a1)=Comm(r1,a1)=$g^{r1}h^{a1}$, where g and h are known parameters in the algorithm. Similarly, according to the amount a2 and the random number r2, the commitment of reserve balance id2 may be calculated to be PC(a2)=Comm(r2,a2)=$g^{r2}h^{a2}$, ..., and the commitment of reserve balance idm may be calculated to be PC(am)=Comm(rm,am)=$g^{rm}h^{am}$ according to the amount am and the random number rm.

Step 504, the remitter calculates a range proof corresponding to each reserve balance to indicate that the reserve balance is not smaller than zero.

In some embodiments, the remitter may generate a range proof corresponding to each reserve balance by means of, such as the Bulletproofs method or the Borromean ring signature method. For example, a range proof Pf_1 corresponding to the reserve balance id1 may be generated to prove that the amount of the reserve balance id1 meets a1≥0; similarly, a range proof Pf_2 corresponding to the reserve balance id2 may be generated to prove that the amount of the reserve balance id2 meets a2≥0, ..., and a range proof Pf_m corresponding to the reserve balance idm may be generated to prove that the amount of the reserve balance idm meets am≥0.

Step 505, the remitter generates a range proof Pf to prove a sufficient outward remittance balance.

In some embodiments, the fund p1 contained in the outward remittance balance Ac_A is to be divided into corresponding reserve balances id1–idm, so the fund p1 of the outward remittance balance Ac_A may need to be proved sufficient for generating the reserve balances id1–idm. The range proofs Pf may be used to ensure p1≥a1+ ... +am, or p1−a1− ... −am≥0.

Step 506, the remitter signs [(id1, PC(a1), Pf_1), ..., (idm, PC(am), Pf_m), Pf] and executes the transaction.

In some embodiments, the remitter may sign [(id1, PC(a1), Pf_1), ..., (idm, PC(am), Pf_m), Pf] through the remitter's private key to obtain a corresponding signature SigA. The remitter may assemble the transaction [A; (id1, PC(a1),Pf_1), ..., (idm, PC(am), Pf_m), Pf; SigA] and submit the transaction to the blockchain via the node 1 to execute this transaction. The transaction may be transmitted to all the blockchain nodes in the blockchain network and all the blockchain nodes may verify the remittance transaction respectively to update the account and create reserve balances when the verification is successful, or to reject to update the account when the verification is not successful.

Step 507, the blockchain nodes check the signature.

In some embodiments, the blockchain nodes may check if the signature SigA contained in the above-described transaction is correct. If the signature is not correct, the execution of this transaction may be rejected, otherwise the process proceeds to Step 508.

Step 508, the blockchain nodes verify the range proofs.

In some embodiments, the blockchain nodes may verify the range proofs Pf_1-Pf_m and the range proof Pf contained in the above-described transaction to determine whether a1≥0, ..., am≥0 and p1≥a1+ ... +am are met. If not met, the execution of the remittance transaction may be rejected; otherwise the process proceeds to Step 509.

Step 509, the blockchain nodes update the account.

In some embodiments, in the maintained blockchain ledgers, the blockchain nodes update the blockchain account 1 of the user A. For example, the blockchain ledger originally records: an outward remittance balance Ac_A=PC1 and reserve balances Ab_A=[ ] (namely no created reserve balances exist) in the user A's blockchain account 1, where, PC1 is a commitment of the fund contained in the outward remittance balance Ac_A, which may be obtained based on a Pedersen commitment mechanism. Through the interaction process shown in FIG. 5, at least one portion of the fund in the outward remittance balance Ac_A may be used to create reserve balances id1–idm so that the content on the blockchain ledger is updated to: an outward remittance balance Ac_A=PC1−PC(a1)− ... −PC(am) and the reserve balances Ab_A=[(id1, PC(a1)), (id2, PC(a2)), ..., (idm, PC(am))].

Figure 6:
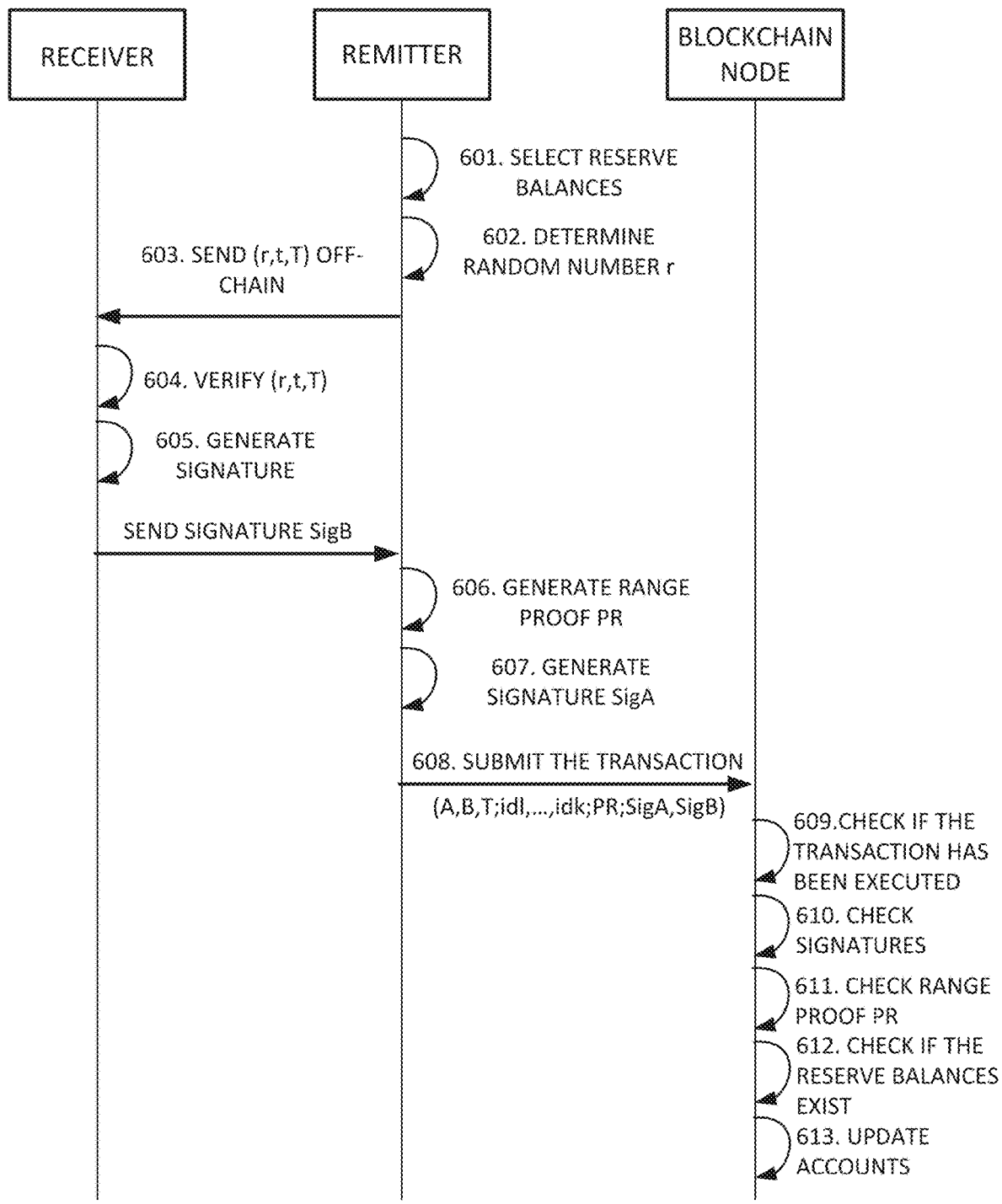
FIG. 6 is a flowchart of an interaction process for implementing a remittance transaction in a blockchain network according to some embodiments.

In some embodiments, the blockchain account 1 of the user A contains the outward remittance balance Ac_A=P1_A, the inward remittance balance Ar_A=P2_A and the reserve balances Ab_A=[(id1,PC(a1)), (id2,PC(a2)), ..., (idm,PC(am))], while the blockchain account 2 of the user B contains the outward remittance balance Ac_B=P1_B, the inward remittance balance Ar_B=P2_B and the reserve balances Ab_B=[ ]. The remittance transaction from the user A to the user B may be implemented by means of an interaction process shown in FIG. 6. FIG. 6 is a flowchart of an interaction process for implementing a remittance transaction in a blockchain network according to some embodiments. As shown in FIG. 6, the interaction process among the remitter, receiver and blockchain nodes may comprise the following steps: 601-613.

Step 601, the remitter selects one or more remitter's reserve balances.

In some embodiments, as described above, a remitter refers to an individual or entity that remits a fund and other resources in a remittance transaction; correspondingly, a receiver refers to an individual or entity that receives a fund and other resources in the remittance transaction. For convenience and conciseness, a remitter and receiver described in the specification may also refer to a computing device associated with the human or entity remitter and receiver respectively. For example, in the embodiments shown in FIG. 2, the user device 1 corresponding to the user A is configured as the remitter, while the user device 2 corresponding to the user B is configured as the receiver.

In some embodiments, when drafting a remittance transaction, the remitter may negotiate a to-be-remitted amount t with the receiver. The remitter may select one or more reserve balances. For example, the remitter may select the reserve balances with IDs of id1–idk. In some embodiments, it may be ensured that the sum of the amounts of the selected reserve balances is not smaller than the to-be-remitted amount t, i.e., a1+ ... +ak≥t. Otherwise the transaction may fail.

Step 602, the remitter determines a random number r with respect to the to-be-remitted amount t.

In some embodiments, the remitter may apply homomorphic encryption algorithm to the to-be-remitted amount t based on a Pedersen commitment mechanism. The remitter may generate a random number r with respect to the to-be-remitted amount t, and then the commitment of the to-be-remitted amount t is T=Comm(r,t)=$g^r h^t$, where g and h are known parameters in the algorithm.

Step 603, the remitter sends (r, t, T) to a receiver via an off-chain channel.

In some embodiments, sending (r, t, T) via an off-chain channel rather than a blockchain network may avoid the remittance random number r and the to-be-remitted amount t being recorded in the blockchain ledger, and ensure the to-be-remitted amount t is concealed except from the remitter and the receiver.

Step 604, the receiver verifies the received (r, t, T).

In some embodiments, a receiver may verify the to-be-remitted amount t to determine that it is the negotiated to-be-remitted amount.

In some embodiments, a receiver may verify the commitment of the to-be-remitted amount T (also referred to as a remittance commitment T). In other words, the receiver may calculate the random number r and the to-be-remitted amount t through a Perdersen commitment mechanism to verify that the remittance commitment T=Comm(r, t). If the equation is satisfied, the verification is successful. If not, the verification is not successful.

Step 605, after the verification succeeds, a signature is generated and returned to the remitter.

In some embodiments, after the verification succeeds, the receiver may use a receiver private key to sign (A, B, T) so as to generate a signature SigB, and return the signature to a remitter. The signature SigB indicates that the receiver agrees to the remittance transaction with the commitment T implemented from the blockchain account 1 of the user A to the blockchain account 2 of the user B.

Step 606, after receiving a signature SigB, the remitter generates a range proof PR.

In some embodiments, after the remitter receives a signature SigB, the remitter determines that the receiver allows implementation of the remittance transaction. The remitter conducts the remittance transaction to the receiver. In some embodiments, the remittance operation is implemented from the blockchain account 1 corresponding to the user A to the blockchain account 2 corresponding to the user B.

In some embodiments, in order to ensure that a remittance transaction is implemented smoothly, blockchain nodes may determine that the to-be-remitted amount t and the selected reserve balances id1–idk meet the following conditions: t≥0 and a1+ . . . +ak≥t. In some embodiments, the range proof enables the blockchain nodes to verify whether a transaction meets the conditions in a ciphertext state. For example, the Bulletproofs method or the Borromean ring signature method may be used to generate the range proof and thus enable the verification in a ciphertext state. That is, the remitter may generate the range proof PR to enable the blockchain nodes to verify that the conditions t≥0 and a1+ . . . +ak≥t are met in the subsequent process.

Step 607, the remitter signs the transaction content (A, B, T; id1, . . . , idk; PR) to generate a signature SigA.

In some embodiments, the remitter may generate the signature SigA by signing the transaction content (A, B, T; id1, . . . , idk; PR) via a remitter private key.

Step 608, the remitter submits the transaction to the blockchain.

In some embodiments, the remitter submits the remittance transaction (A, B, T; id1, . . . , idk; PR; SigA, SigB) to the blockchain via a node 1 to execute the remittance transaction. The remittance transaction may be transmitted to all the blockchain nodes in the blockchain network and all the blockchain nodes may verify the remittance transaction to execute the remittance when the verification is successful, or to reject remittance when the verification is not successful.

Step 609, the blockchain nodes check if the transaction has been executed.

In some embodiments, the blockchain nodes may be any blockchain node in a blockchain network. In other words, every blockchain node in the blockchain network may receive the remittance transaction (A, B, T; id1, . . . , idk; PR; SigA, SigB), and implement verification and other operations through Steps 609-612.

In some embodiments, after blockchain nodes receive the remittance transaction (A, B, T; id1, . . . , idk; PR; SigA, SigB), the blockchain nodes may use the double-spending prevention mechanism or replay attack prevention mechanism to verify if the remittance transaction has been executed. If the remittance transaction has been executed, another execution of this remittance transaction (A, B, T; id1, . . . , idk; PR; SigA, SigB) may be rejected, otherwise the process proceeds to Step 610.

Step 610, the blockchain nodes check the signatures.

In some embodiments, the blockchain nodes may check if the signatures SigA and SigB contained in the remittance transaction (A, B, T; id1, . . . , idk; PR; SigA, SigB) are correct or not. If the signatures are not correct, the execution of this remittance transaction may be rejected, otherwise the process proceeds to Step 611.

Step 611, the blockchain nodes check the range proof PR.

In some embodiments, the blockchain nodes may, based on a range proof technology, check the range proof PR contained in the remittance transaction (A, B, T; id1, . . . , idk; PR; SigA, SigB) to determine if the conditions t≥0 and a1+ . . . +ak≥t are met or not. If the conditions are not met, the execution of this remittance transaction may be rejected; otherwise the process proceeds to Step 612.

Step 612, the blockchain nodes check if the reserve balances exist.

In some embodiments, with respect to the reserve balances id1–idk involved in the remittance transaction (A, B, T; id1, . . . , idk; PR; SigA, SigB), the blockchain nodes may check the maintained blockchain ledgers to determine whether these reserve balances id1–idk exist in the blockchain account 1 of the user A. If absent, the execution of the remittance transaction may be rejected, otherwise the process proceeds to Step 613.

Step 613, in the maintained blockchain ledgers, the blockchain nodes update the blockchain accounts to which the user A and the user B correspond respectively.

In some embodiments, after the verification in Steps 609-612 succeeds, the blockchain nodes may update the blockchain account 1 and the blockchain account 2 recorded in the blockchain ledgers respectively.

With respect to the blockchain account 1 of the user A, the reserve balances with the IDs of id1–idk are used to execute the remittance transaction. As a result, the reserve balances Ab_A are updated to Ab_A=[(idk+1, PC(ak+1)), (idk+2, PC(ak+2)), . . . , (idm, PC(am))]. Since a1+ . . . +ak is not always capable of being equal to the to-be-remitted amount t, a change amount a1+ . . . +ak−t may be generated when a1+ . . . +ak>t. The change amount is to be transferred into the blockchain account 1, so it is added to the inward remittance balance Ar_A. Accordingly, the inward remittance balance Ar_A is updated to Ar_A= P2_A+PC(a1)+ . . . +PC(ak)−T. The outward remittance balance Ac_A=P1_A remains unchanged.

With respect the blockchain account 2 of the user B, the above-described remittance transaction is an inward remittance transaction. The inward remittance balance Ar_B is updated based on the to-be-remitted amount t to obtain the updated inward remittance balance Ar_B=P2_B+T. The outward remittance balance Ac_B=P1_B and the reserve balance Ab_B=[ ] remain unchanged.

In summary, by applying homomorphic encryption mechanisms, balances in blockchain accounts can be encrypted. After encryption, the commitments of the balances in blockchain accounts may be recorded in blockchain ledgers. The to-be-remitted amounts may also be encrypted during the process of remittance transactions, and used in the implementation of remittance transactions. Therefore, the remittance transactions can be implemented successfully via the blockchain network, while the account balance and outward remittance amount are kept confidential and the blockchain nodes' verification of transaction conditions is not affected, thereby enabling the blockchain network to protect privacies.

In addition, the improved blockchain account structure includes inward remittance balances and reserve balances, allowing the blockchain account to participate in inward remittance transactions and outward remittance transactions simultaneously and independently. Different reserve balances may be used to participate in different outward remittance transactions. While existing reserve balances created from an outward remittance balance are being used to participate in outward remittance transactions, the outward remittance balance may be simultaneously divided to create new reserve balances without interference to and from the outward remittance transactions, thereby greatly improving the transaction throughput.

Figure 7:
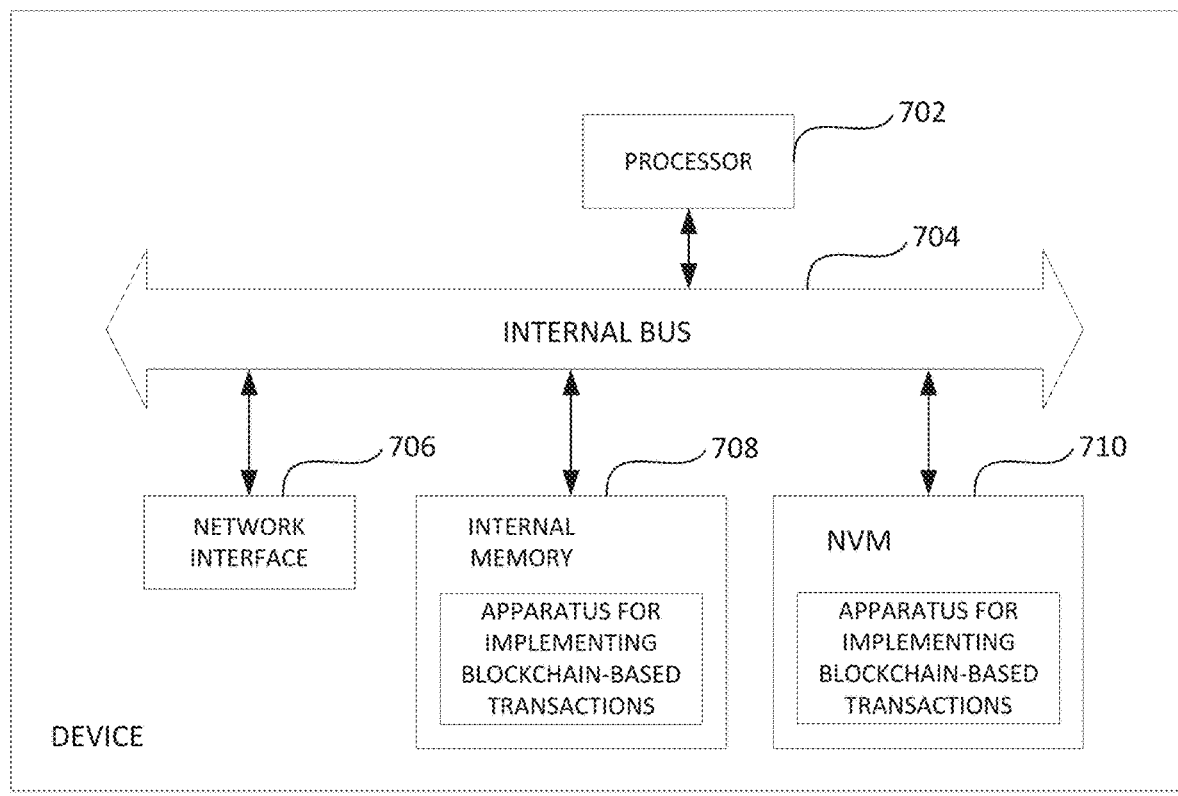
FIG. 7 is a schematic structural diagram of a device for implementing blockchain-based transactions according to some embodiments.

FIG. 7 is a schematic structural diagram of a device for implementing blockchain-based transactions according to some embodiments. As shown in FIG. 7, at a hardware level, the device comprises a processor 702, an internal bus 704, a network interface 706, an internal memory 708 and a nonvolatile memory (NVM) 710. In some embodiments, the device may further comprise other pieces of hardware for transactions. The processor 702 reads corresponding computer programs from the NVM 710 to the internal memory 708 and then executes the computer programs to form a blockchain transaction apparatus at a logical level. In addition to the software implementation manner, one or more embodiments of the specification do not exclude other implementation manners, such as a logic device or a combination of software and hardware. That is, the executive bodies of the following processing flow are not limited to logical units, and may be hardware or logic devices.

Figure 8:
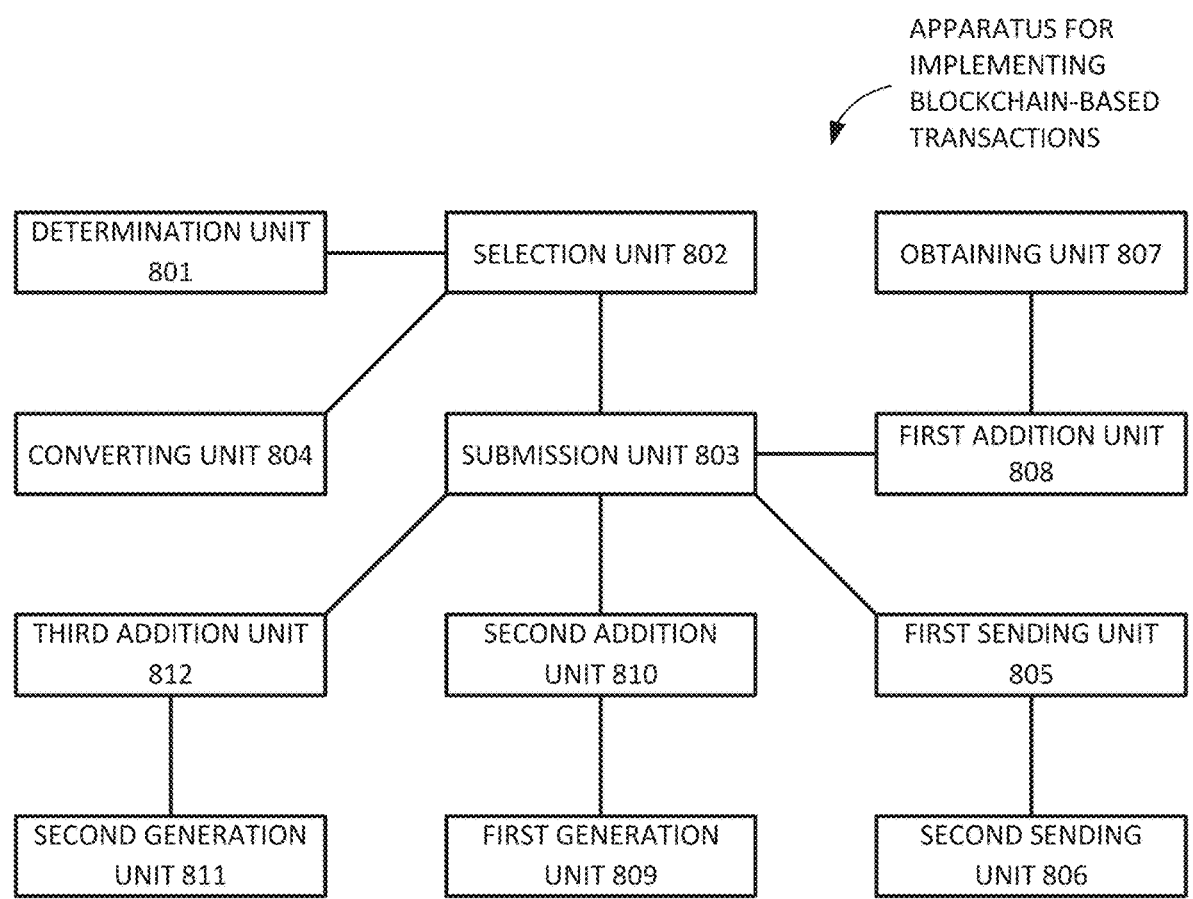
FIG. 8 is a block diagram of an apparatus for implementing blockchain-based transactions according to some embodiments.

Referring to FIG. 8, a block diagram of an apparatus is provided for implementing blockchain-based transactions according to some embodiments. As shown in FIG. 8, in the software implementation manner, the apparatus for implementing blockchain-based transactions is implementable by computing devices as remitter devices and may comprise the following units: a determination unit 801 for determining a transaction amount to be remitted from a remitter's blockchain account into a receiver's blockchain account, wherein a balance of the remitter's blockchain account comprises a plurality of reserve balances, and a commitment of each of the plurality of reserve balances is recorded in a blockchain; a selection unit 802 for selecting one or more of the plurality of reserve balances from the remitter's blockchain account, wherein the sum of the selected one or more of the plurality of reserve balances is not smaller than the transaction amount; and a submission unit 803 for submitting to the blockchain a transaction comprising an identification of each of the selected one or more of the plurality of reserve balances and a commitment of the transaction amount, for the selected one or more of the plurality of reserve balances to be removed from the remitter's blockchain account and the transaction amount to be added to the receiver's blockchain account after the transaction is implemented.

In some embodiments, the balance of the remitter's blockchain account further comprises a first inward remittance balance. In response that the balance of the remitter's blockchain account increases, a corresponding amount is added to the first inward remittance balance.

In some embodiments, the balance of the remitter's blockchain account further comprises an outward remittance balance. At least one portion of the outward remittance balance is further divided into the plurality of remitter's reserve balances. The apparatus further comprises: a converting unit 804 for converting or allocating at least one part of the first inward remittance balance to the outward remittance balance.

In some embodiments, when the sum of the selected remitter's reserve balance is greater than the transaction amount, a change amount is added to the first inward remittance balance after the transaction is implemented. The change amount is the difference between the sum of the selected remitter's reserve balance and the transaction amount.

In some embodiments, a balance of the receiver's blockchain account comprises a second inward remittance balance, and a commitment of the second inward remittance balance is recorded in the blockchain. The commitment of the transaction amount is added to the commitment of the second inward remittance balance after the transaction is implemented.

In some embodiments, the commitment of the transaction amount is calculated by applying a predetermined encryption algorithm to the transaction amount based on a transaction random number, and the commitment of the second inward remittance balance is calculated by applying a predetermined encryption algorithm to the second inward remittance balance based on an inward remittance balance random number. The apparatus further comprises: a first sending unit 805 for sending the transaction random number to a receiver device via an off-chain channel for the receiver device to determine an updated second inward remittance balance according to an updated commitment of the second inward remittance balance and an updated inward remittance balance random number. The updated commitment of the second inward remittance balance is obtained by adding the commitment of the transaction amount to the commitment of the second inward remittance balance, the updated inward remittance balance random number is obtained by adding the transaction random number to the inward remittance balance random number, and the updated second inward remittance balance is the sum of the second inward remittance balance and the transaction amount.

In some embodiments, the apparatus further comprises: a second sending unit 806 for sending the commitment of the transaction amount to the receiver device via an off-chain channel before submission of the transaction so that the receiver device verifies the associations among the commitment of the transaction amount, the transaction random number and the transaction amount.

In some embodiments, the apparatus further comprises: an obtaining unit 807 for obtaining a receiver signature endorsing the commitment of the transaction amount, where the receiver signature is generated by the computing device associated with the receiver based on a receiver private key, in response to successful verification of the association; and a first addition unit 808 for adding the receiver signature to the transaction for the blockchain nodes in the blockchain to verify the receiver signature.

In some embodiments, the apparatus further comprises: a first generation unit 809 for generating a remitter signature endorsing the commitment of the transaction amount based on a remitter private key; and a second addition unit 810 for adding the remitter signature to the transaction for the blockchain nodes in the blockchain to verify the remitter signature.

In some embodiments, the apparatus further comprises: a second generation unit 811 for generating a range proof; and a third addition unit 812 for adding the range proof to the transaction for the blockchain nodes in the blockchain to verify that the transaction amount is not smaller than zero and the sum of the selected remitter's reserve balances is not smaller than the transaction amount.

The systems, apparatuses, modules or units illustrated in the foregoing embodiments may be achieved by computer chips or entities, or by products with certain functions. A typical device is computer. An example of the computer may be a personal computer, laptop computer, cell phone, camera phone, smart phone, PDA (personal digital assistant), media player, navigation device, email sending and receiving device, game console, tablet computer, wearable device or any combination of a few of these devices.

In a typical configuration, the computer comprises one or more processors (CPU), I/O interfaces, network interfaces and internal memories. The internal memory may be in a form of volatile memory, random access memory (RAM) and/or non-volatile memory such as read-only memory (ROM) or flash memory (flash RAM) in the computer readable media. Internal memory is an example of computer readable media.

Computer readable media include non-volatile and volatile, movable and non-movable media and may achieve information storage by any method or technology. Information may be computer readable instructions, data structures, program modules or other data. Examples of computer storage media include, but are not limited to, phase change random access memory (PRAM), static random access memory (SRAM), dynamic random access memory (DRAM) and other types of random access memory (RAM), read only memory (ROM), electrically erasable programmable read only memory (EEPROM), flash memory or other memory technologies, compact disc-read only memory (CD-ROM), digital versatile disc (DVD) or other optical memory, cassette type magnetic tape, magnetic disk memory, quantum memory, graphene-based storage media, or other magnetic storage devices or any other non-transfer media, which may be used to store information that is accessible to computer devices. According to the specification, computer readable media do not include transitory media, such as modulated data signals and carriers.

It should be further noted that terms "include," "contain" or any variants of these terms are intended to cover non-exclusive inclusion so that a process, method, commodity or equipment including a series of elements not only includes these elements but also includes other elements not clearly set out, or also include the elements inherent to such process, method, commodity or equipment. Unless otherwise with more limitations, the elements defined by a sentence "include one . . . " do not exclude that the process, method, commodity or equipment including the elements also have other same elements.

Embodiments of the specification are described above. Other embodiments are in the scope of the attached claims. In some embodiments, the actions or steps recorded in the claims may be executed in a sequence different from that given in the embodiments and can still achieve the expected results. Further, it is not necessary for the process described in the accompanying drawings to require the given specific sequence or a continuous sequence in order to achieve the expected results. In some embodiments, multitasking processing and parallel processing are also acceptable or may be favorable.

The terms used in one or a plurality of embodiments of the specification are for the purpose of describing embodiments and not intended to limit one or more embodiments of the specification. The singular forms "one," "the" and "this" used in one or more embodiments of the specification and in the attached claims also are intended to cover plural forms unless their meanings are otherwise clearly indicated in the context. It should also be understood that the term "and/or" used in the text refers to any or all possible combinations containing one or more associated listed items.

It should be understood that although one or more embodiments of the specification may use terms such as first, second and third to describe various kinds of information, the information should not be limited to these terms. These terms are intended to differentiate information of the same type. For example, without departing from the scope of one or more embodiments of the specification, first information may also be referred to as second information, and similarly, second information may also be referred to as first information. Subject to the context, term "if" used here may be interpreted as "at the time of . . . ," "when . . . ," or "in response to determination."

The foregoing description is not intended to limit one or more embodiments of the specification. Any modifications, equivalent replacements and improvements made without departing from the spirit and principle of one or more embodiments of the specification shall fall within the scope of one or more embodiments of the specification.

The invention claimed is:

1. A computer-implemented method for implementing blockchain-based transactions, comprising:

determining, by a first computing device associated with a remitter, a transaction amount to be remitted from a blockchain account of the remitter into a blockchain account of a receiver, wherein a balance of the blockchain account of the remitter is divided into a plurality of reserve balances, and a commitment of each of the plurality of reserve balances is recorded in a blockchain of a blockchain network, wherein the balance of the blockchain account of the remitter further comprises an outward remittance balance, and the outward remittance balance comprises the plurality of the reserve balances;

generating, by the first computing device, a commitment of the transaction amount, wherein the commitment of the transaction amount is an encryption of the transaction amount based on a transaction random number;

selecting, by the first computing device, one or more of the plurality of reserve balances from the blockchain account of the remitter, wherein the sum of the selected one or more of the plurality of reserve balances exceeds or equals the transaction amount;

sending, by the first computing device, via an off-chain channel, the transaction random number, the transaction amount, and the commitment of the transaction amount to a second computing device associated with the receiver for the second computing device to (i) verify an association among the commitment of the transaction amount, the transaction random number, and the transaction amount, and (ii) generate a receiver signature based on a receiver private key and endorsing the commitment of the transaction amount in response to successful verification of the association;

obtaining, by the first computing device, the receiver signature;

generating, by the first computing device, a range proof that enables a plurality of blockchain nodes of the blockchain network to verify that the sum of the selected one or more of the plurality of reserve balances exceeds or equals the transaction amount;

generating, by the first computing device, using a private key of the remitter, a sender signature endorsing the commitment of the transaction amount and the range proof;

generating, by the first computing device, a transaction comprising: an identification of each of the selected one or more of the plurality of reserve balances, the commitment of the transaction amount, the range proof, the sender signature, and the receiver signature;

submitting, by the first computing device, the transaction to the plurality of blockchain nodes of the blockchain network that authenticate the sender signature and the receiver signature, and verify based on the range proof that the sum of the selected one or more of the plurality of reserve balances exceeds or equals the transaction amount, wherein the balance of the blockchain account of the remitter further comprises a first inward remittance balance;

simultaneously participating, by the first computing device, in (i) the transaction using the outward remittance balance and (ii) an inward remittance transaction using the first inward remittance balance; and updating the outward remittance balance of the blockchain account of the remitter according to the transaction amount.

2. The computer-implemented method of claim 1, further comprising: in response to the balance of the blockchain account of the remitter increasing, adding an amount corresponding to the increase to the first inward remittance balance.

3. The computer-implemented method of claim 2, wherein, in response to that the sum of the selected one or more of the plurality of reserve balances is greater than the transaction amount, a change amount is added to the first inward remittance balance after the transaction is implemented, and wherein the change amount is the difference between the sum of the selected one or more of the plurality of reserve balances and the transaction amount.

4. The computer-implemented method of claim 1, further comprising: converting at least one part of the first inward remittance balance to the outward remittance balance.

5. The computer-implemented method of claim 1, wherein a balance of the blockchain account of the receiver comprises a second inward remittance balance, and a commitment of the second inward remittance balance is recorded in the blockchain; and wherein the commitment of the transaction amount is added to the commitment of the second inward remittance balance after the transaction is implemented.

6. The computer-implemented method of claim 5, wherein the commitment of the second inward remittance balance is an encryption of the second inward remittance balance based on an inward remittance balance random number.

7. The computer-implemented method of claim 6, wherein:

the second computing device associated with the receiver that determines an updated second inward remittance balance according to an updated commitment of the second inward remittance balance and an updated inward remittance balance random number; and the updated commitment of the second inward remittance balance is obtained by adding the commitment of the transaction amount to the commitment of the second inward remittance balance, the updated inward remittance balance random number is obtained by adding the transaction random number to the inward remittance balance random number, and the updated second inward remittance balance is the sum of the second inward remittance balance and the transaction amount.

8. The computer-implemented method of claim 1, wherein submitting the transaction to the plurality of blockchain nodes of the blockchain network comprises submitting the transaction to the plurality of blockchain nodes of the blockchain network to cause the selected one or more of the plurality of reserve balances to be removed from the blockchain account of the remitter and the transaction amount to be added to the blockchain account of the receiver after the transaction is implemented.

9. A non-transitory computer-readable storage medium storing instructions that, when executed by a processor, cause a first computing device associated with a remitter to perform a method, the method comprising:

determining a transaction amount to be remitted from a blockchain account of the remitter into a blockchain account of a receiver, wherein a balance of the blockchain account of the remitter is divided into a plurality of reserve balances, and a commitment of each of the plurality of reserve balances is recorded in a blockchain of a blockchain network, wherein the balance of the blockchain account of the remitter further comprises an outward remittance balance, and the outward remittance balance comprises the plurality of the reserve balances;

generating, by the first computing device, a commitment of the transaction amount, wherein the commitment of the transaction amount is an encryption of the transaction amount based on a transaction random number;

selecting one or more of the plurality of reserve balances from the blockchain account of the remitter, wherein the sum of the selected one or more of the plurality of reserve balances exceeds or equals the transaction amount;

sending, by the first computing device, via an off-chain channel, the transaction random number, the transaction amount, and the commitment of the transaction amount to a second computing device associated with the receiver for the second computing device to (i) verify an association among the commitment of the transaction amount, the transaction random number, and the transaction amount, and (ii) generate a receiver signature based on a receiver private key and endorsing the commitment of the transaction amount in response to successful verification of the association;

obtaining, by the first computing device, the receiver signature;

generating a range proof that enables a plurality of blockchain nodes of the blockchain network to verify that the sum of the selected one or more of the plurality of reserve balances exceeds or equals the transaction amount;

generating using a private key of the remitter, a sender signature endorsing the commitment of the transaction amount and the range proof;

generating a transaction comprising: an identification of each of the selected one or more of the plurality of reserve balances, the commitment of the transaction amount, the range proof, the sender signature, and the receiver signature;

submitting the transaction to the plurality of blockchain nodes of the blockchain network that authenticate the sender signature and the receiver signature, and verify based on the range proof that the sum of the selected one or more of the plurality of reserve balances exceeds or equals the transaction amount, wherein the balance of the blockchain account of the remitter further comprises a first inward remittance balance; and simultaneously participating, by the first computing device, in (i) the transaction using the outward remittance balance and (ii) an inward remittance transaction using the first inward remittance balance; and updating the outward remittance balance of the blockchain account of the remitter according to the transaction amount.

10. The non-transitory computer-readable storage medium of claim 9, wherein the method further comprises: in response to the balance of the blockchain account of the remitter increasing, adding an amount corresponding to the increase to the first inward remittance balance.

11. The non-transitory computer-readable storage medium of claim 10, wherein, in response to that the sum of the selected one or more of the plurality of reserve balances is greater than the transaction amount, a change amount is added to the first inward remittance balance after the transaction is implemented, and wherein the change amount is the difference between the sum of the selected one or more of the plurality of reserve balances and the transaction amount.

12. The non-transitory computer-readable storage medium of claim 9, wherein a balance of the blockchain account of the remitter comprises a second inward remittance balance, and a commitment of the second inward remittance balance is recorded in the blockchain; and wherein the commitment of the transaction amount is added to the commitment of the second inward remittance balance after the transaction is implemented.

13. The non-transitory computer-readable storage medium of claim 12, wherein the commitment of the second inward remittance balance is an encryption of the second inward remittance balance based on an inward remittance balance random number.

14. The non-transitory computer-readable storage medium of claim 13, wherein:

the second computing device associated with the receiver determines an updated second inward remittance balance according to an updated commitment of the second inward remittance balance and an updated inward remittance balance random number; and the updated commitment of the second inward remittance balance is obtained by adding the commitment of the transaction amount to the commitment of the second inward remittance balance, the updated inward remittance balance random number is obtained by adding the transaction random number to the inward remittance balance random number, and the updated second inward remittance balance is the sum of the second inward remittance balance and the transaction amount.

15. A system, comprising:

a processor; and a non-transitory computer-readable storage medium storing instructions that, when executed by the processor, cause the system to perform a method, the method comprising:

determining a transaction amount to be remitted from a blockchain account of a remitter into a blockchain account of a receiver, wherein a balance of the blockchain account of the remitter is divided into a plurality of reserve balances, and a commitment of each of the plurality of reserve balances is recorded in a blockchain of a blockchain network, wherein the balance of the blockchain account of the remitter further comprises an outward remittance balance, and the outward remittance balance comprises the plurality of the reserve balances;

generating, by the first computing device, a commitment of the transaction amount, wherein the commitment of the transaction amount is an encryption of the transaction amount based on a transaction random number;

selecting one or more of the plurality of reserve balances from the blockchain account of the remitter, wherein the sum of the selected one or more of the plurality of reserve balances exceeds or equals the transaction amount;

sending, by the first computing device, via an off-chain channel, the transaction random number, the transaction amount, and the commitment of the transaction amount to a second computing device associated with the receiver for the second computing device to (i) verify an association among the commitment of the transaction amount, the transaction random number, and the transaction amount, and (ii) generate a receiver signature based on a receiver private key and endorsing the commitment of the transaction amount in response to successful verification of the association;

obtaining, by the first computing device, the receiver signature;

generating a range proof that enables a plurality of blockchain nodes of the blockchain network to verify that the sum of the selected one or more of the plurality of reserve balances exceeds or equals the transaction amount;

generating using a private key of the remitter, a sender signature endorsing the commitment of the transaction amount and the range proof;

generating a transaction comprising: an identification of each of the selected one or more of the plurality of reserve balances, the commitment of the transaction amount, the range proof, the sender signature, and the receiver signature;

submitting the transaction to the plurality of blockchain nodes of the blockchain network that authenticate the sender signature and the receiver signature, and verify based on the range proof that the sum of the selected one or more of the plurality of reserve balances exceeds or equals the transaction amount, wherein the balance of the blockchain account of the remitter further comprises a first inward remittance balance; and simultaneously participating, by the first computing device, in (i) the transaction using the outward remittance balance and (ii) an inward remittance transaction using the first inward remittance balance; and updating the outward remittance balance of the blockchain account of the remitter according to the transaction amount.

* * * * *

UNITED STATES PATENT AND TRADEMARK OFFICE
CERTIFICATE OF CORRECTION

| | |
|---|---|
| PATENT NO. | : 11,170,374 B2 |
| APPLICATION NO. | : 16/817741 |
| DATED | : November 9, 2021 |
| INVENTOR(S) | : Lichun Li et al. |

It is certified that error appears in the above-identified patent and that said Letters Patent is hereby corrected as shown below:

In the Claims
In Claim 7, Column 19, Line 58, "receiver that determines" should read -- receiver determines --.

Signed and Sealed this
Third Day of October, 2023

Katherine Kelly Vidal
*Director of the United States Patent and Trademark Office*